United States Patent
Yeh et al.

(10) Patent No.: US 10,402,453 B2
(45) Date of Patent: Sep. 3, 2019

(54) UTILIZING LARGE-SCALE KNOWLEDGE GRAPHS TO SUPPORT INFERENCE AT SCALE AND EXPLANATION GENERATION

(71) Applicant: Nuance Communications, Inc., Burlington, MA (US)

(72) Inventors: Peter Zei-Chan Yeh, San Jose, CA (US); Adwait Ratnaparkhi, San Jose, CA (US); Benjamin Birch Douglas, San Francisco, CA (US); William Lawrence Jarrold, San Francisco, CA (US)

(73) Assignee: Nuance Communications, Inc., Burlington, MA (US)

( * ) Notice: Subject to any disclaimer, the term of this patent is extended or adjusted under 35 U.S.C. 154(b) by 1035 days.

(21) Appl. No.: 14/551,837

(22) Filed: Nov. 24, 2014

(65) Prior Publication Data
US 2015/0379414 A1    Dec. 31, 2015

Related U.S. Application Data

(60) Provisional application No. 62/018,152, filed on Jun. 27, 2014.

(51) Int. Cl.
*G06N 5/02* (2006.01)
*G06F 16/901* (2019.01)

(52) U.S. Cl.
CPC ......... *G06F 16/9024* (2019.01); *G06N 5/022* (2013.01)

(58) Field of Classification Search
None
See application file for complete search history.

(56) References Cited

U.S. PATENT DOCUMENTS

| | | | |
|---|---|---|---|
| 6,594,618 B1* | 7/2003 | Azencott | G05B 23/0221 702/182 |
| 8,494,985 B1* | 7/2013 | Keralapura | H04L 63/0245 706/12 |

(Continued)

OTHER PUBLICATIONS

Badica et al. A New Path Generalization Algorithm for HTML Wrapper Induction. Advances in Web Intelligence and Data Mining (SCI) 23, 11-20 (2006).*

(Continued)

*Primary Examiner* — Alexey Shmatov
*Assistant Examiner* — Robert Bejcek, II
(74) *Attorney, Agent, or Firm* — Brian J. Colandreo; Michael T. Abramson; Holland & Knight LLP

(57) ABSTRACT

Aspects discussed herein present a solution for utilizing large-scale knowledge graphs for inference at scale and generating explanations for the conclusions. In some embodiments, aspects discussed herein learn inference paths from a knowledge graph and determine a confidence score for each inference path. Aspects discussed herein may apply the inference paths to the knowledge graph to improve database lookup, keyword searches, inferences, etc. Aspects discussed herein may generate a natural language explanation for each conclusion or result from one or more inference paths that led to that conclusion or result. Aspects discussed herein may present the best conclusions or results to the user based on selection strategies. The presented results or conclusions may include generated natural language explanations rather than links to documents with word occurrences highlighted.

20 Claims, 7 Drawing Sheets

(56) References Cited

U.S. PATENT DOCUMENTS

| | | | | |
|---|---|---|---|---|
| 9,411,857 B1* | 8/2016 | Chechik | ............ | G06F 17/30864 |
| 2011/0307244 A1* | 12/2011 | He | ...................... | G06F 17/2818 |
| | | | | 704/4 |
| 2013/0080461 A1* | 3/2013 | Byrne | ............... | G06F 17/30654 |
| | | | | 707/769 |
| 2013/0289994 A1* | 10/2013 | Newman | ................. | G10L 15/22 |
| | | | | 704/254 |

OTHER PUBLICATIONS

Bouayad-Agha et al. Natural Language Generation and Semantic Web Technologies. 2012.*

Cappellari et al. Path-oriented keyword search over graph-modeled Web data. WorldWide Web (2012) 15:631-661.*

Holm et al. Searching protein structure databases with DaliLite v.3. Bioinformatics Applications Note vol. 24 No. 23 2008, pp. 2780-2781.*

Nettleton, David F. Data mining of social networks represented as graphs. C O M P U T E R S C I E N C E R E V I EW 7( 2013) 1-3 4.*

Assuncao et al. Context-aware Job Scheduling for Cloud Computing Environments. 2012 IEEE/ACM Fifth International Conference on Utility and Cloud Computing (Year: 2012).*

\* cited by examiner

UTILIZING LARGE-SCALE KNOWLEDGE GRAPHS TO SUPPORT INFERENCE AT SCALE AND EXPLANATION GENERATION

RELATED APPLICATIONS

This application claims, under 35 U.S.C. § 119, the benefit of provisional application No. 62/018,152, filed Jun. 27, 2014, entitled "Utilizing Large-Scale Knowledge Graphs to Support Inference at Scale and Explanation Generation" the contents of which is hereby incorporated by reference in its entirety for all purposes.

FIELD

Aspects described herein relate generally to the implementation of large data structures in computer software and hardware systems. Aspects herein describe efficient utilization of large-scale knowledge graphs and, more specifically, various aspects herein describe systems and methodologies for utilizing large-scale knowledge graphs to enable robust inference at scale and generate logically-motivated explanations for conclusions or results derived from a knowledge graph.

BACKGROUND

Knowledge graphs provide rich semantic relations between entities. The recent availability of large-scale knowledge graphs (e.g., FACEBOOK's social graph) can provide a powerful resource for developers and computer programs to provide answers to user queries. However, large knowledge graphs may be very densely connected by, for example, tens of thousands of paths. Current solutions that follow all of these paths for a given query will return many incorrect answers because at least some of these paths will be irrelevant. Furthermore, this approach is costly and difficult to scale as knowledge graphs continue to increase in size and complexity.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In some embodiments, a knowledge-scaling system may perform robust inferences at scale to derive results (e.g., conclusions) across various topics of interest. For example, the knowledge-scaling system may automatically learn the relevant inference steps (e.g., inference paths) for any topic of interest to an application (e.g., a virtual assistant) thereby reducing the amount of manual effort and time to identify or construct these inference paths. In some embodiments, aspects discussed herein learn the inference paths from a knowledge graph structure and determine a confidence score on the quality of each inference path. The confidence score of each inference path may be used to assess the validity of the results and rank the results based on their validity. Additional aspects discussed herein provide a robust framework over the knowledge graph structure from which it learns. The knowledge graph structure can range from a basic instance-relation graph to a logic-based formal ontology. Additional aspects discussed herein learn inference paths that are in a declarative, human-understandable form, which allows a human-in-the-loop (e.g., an ontologist, etc.) to revise or edit the learned inference paths.

In some embodiments, a knowledge-scaling system may apply inference paths to a knowledge graph structure to reach results on a topic that may come up when an application (e.g., TV program discovery, virtual assistant, etc.) query a database, perform a keyword search, etc. In some embodiments, aspects discussed herein improve database lookup by using the results to expand the constraints in a database query (e.g., further constrain a user request) to improve results precision. Further improvements to database lookup may be achieved by using the results to better align a database query with the target database. For example, constraints in the database query that do not map to any elements in the database may be replaced with results that do map to at least one element in the database to thereby improving recall. In some embodiments, aspects discussed herein improve keyword searches by using the results to expand the keyword terms. In some embodiments, aspects discussed herein improve inferences by augmenting the results of a logic-based inference engine. In some embodiments, aspects discussed herein improve database lookup by using the results to expand and/or modify a database query.

In some embodiments, a knowledge-scaling system may generate natural language explanations for each result from all inference paths that led to the result. Aspects discussed herein reduce the verbosity of the explanations for each result by selecting the best ones to present to the user by using configurable selection strategies along with the validity of the result. Additional aspects discussed herein return the result along with a logically valid explanation (in natural language) instead of returning links to documents with word occurrences (e.g., keywords) highlighted.

BRIEF DESCRIPTION OF THE DRAWINGS

A more complete understanding of the knowledge-scaling solution and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the knowledge-scaling solution may be practiced. It is to be understood that other embodiments may be utilized and structural and functional modifications may be made without departing from the scope of the aspects described herein. The knowledge-scaling solution is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
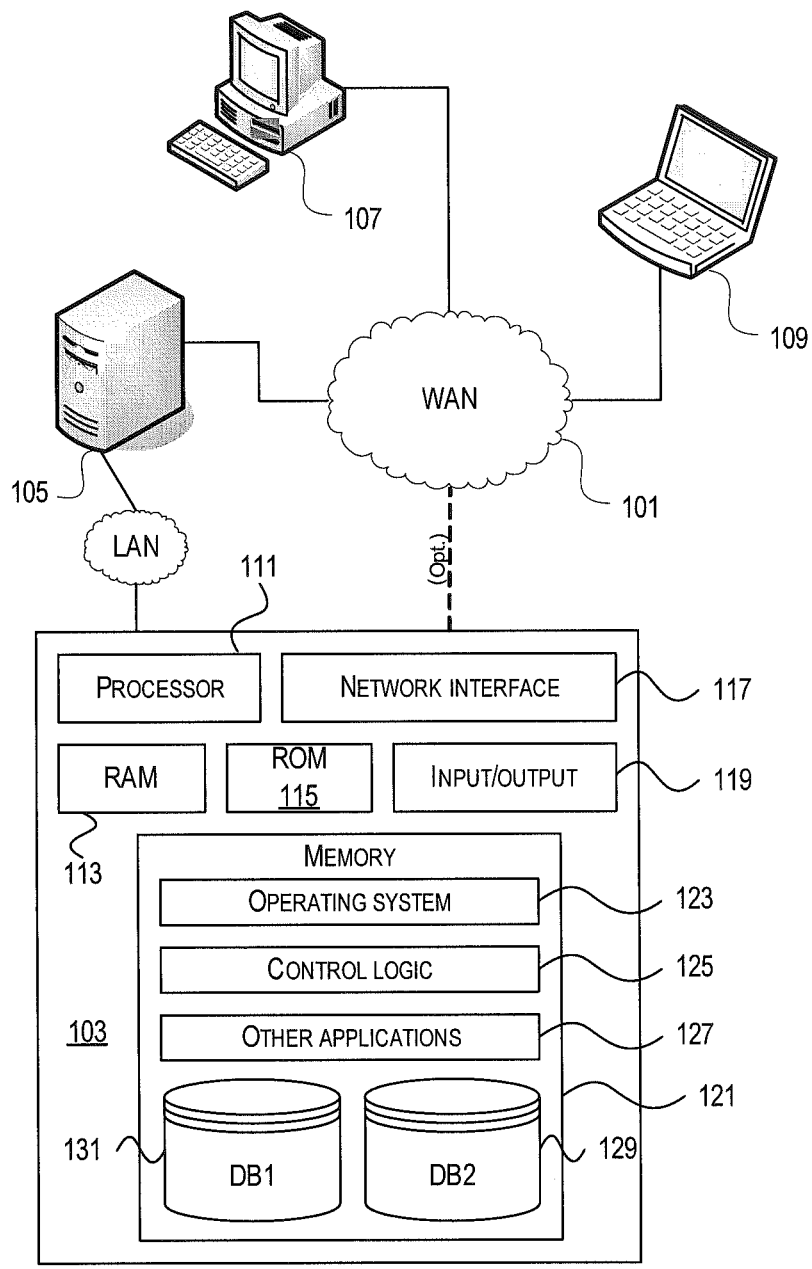
FIG. 1 illustrates an example of a network architecture and data processing device that may be used to implement one or more illustrative aspects of the knowledge-scaling solution.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used. The specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. The functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Typically, when an application searches for answers to a user input query, the application might not return results if the search terms and/or constraints of the query are not part of a particular field or schema of the data and/or information source being queried. For example, when a user searches for the term "spy," a book application may return results where the term "spy" is found in the title field and might not return results of titles that do not have the term "spy" in their title field. However, a knowledge scaling system may perform inferences over rich semantic relations between entities of a knowledge graph to improve the quality of the results by allowing the knowledge scaling system to infer more appropriate and/or accurate answers to the user query. For example, the knowledge scaling system may accurately infer a topic of interest (e.g., that one or more novels may include one or more characters that are spies and return those results). Because a large scale knowledge graph may be very densely connected (i.e., there may be numerous paths from one entity to another), the knowledge scaling system may accurately traverse the large scale knowledge graph by encoding these inferences as inference paths through the knowledge graph. Additionally, the knowledge scaling system may generate logically-motivated natural language explanations.

Figure 5:
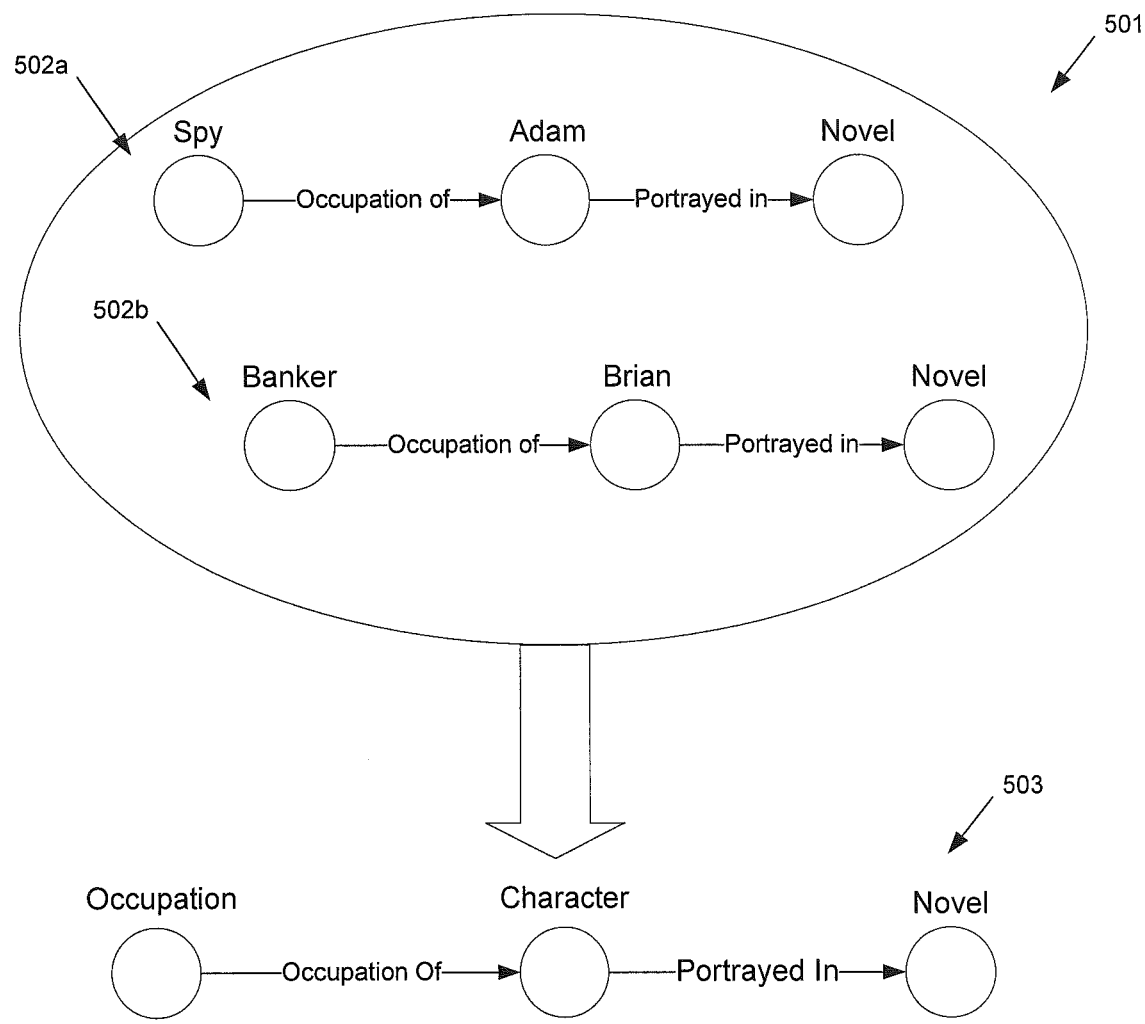
FIG. 5 illustrates an example of two instance-level paths being generalized into an inference path in accordance with one or more illustrative aspects discussed herein.

An inference path may include one or more nodes (e.g., entities) connected by one or more edges (e.g., relations). For example, an inference path may include one or more edges defining one or more semantic relations to traverse and the nodes may impose one or more type constraints on one or more entities/instances that instantiate the inference path. An illustrative example of inference path is shown in FIG. 5 (e.g., inference path 503), which will be described in detail below.

Figure 2:
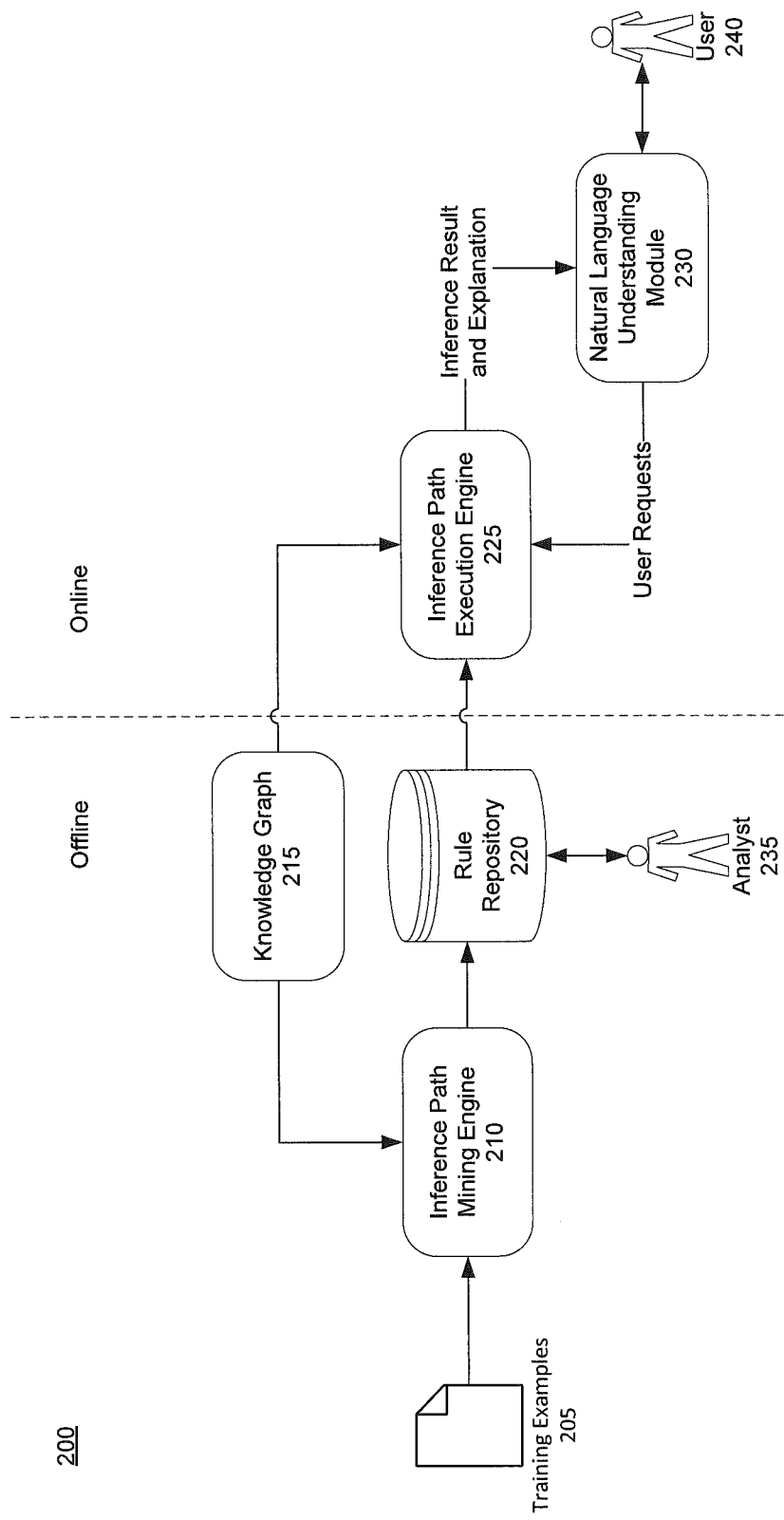
FIG. 2 illustrates an example of a knowledge-scaling system in accordance with one or more illustrative aspects discussed herein.

FIG. 2 illustrates one example of a knowledge scaling system in accordance with one or more illustrative aspects discussed herein. The knowledge scaling system 200 may include one or more software modules and one or more databases embodied on or distributed across multiple components (e.g., the data server 103, the web server 105, the client computers 107, 109, and/or any other computing device). For example, a knowledge scaling system 200 may include training data 205, an inference path mining engine (IPME) 210, a knowledge graph 215, a rule repository 220, an inference path execution engine (IPEE) 225, and a natural language understanding module (NLU) 230.

The IPME 210 may mine the knowledge graph 215 for inference paths of relevant topics of interest and store the resulting inference paths in rule repository 220. In some embodiments, the IPME 210 may be semi-supervised by a human and/or may be executed in an offline mode. For example, an analyst 235 (e.g., a knowledge engineer) may review and/or otherwise analyze the inference paths for accuracy, completeness, etc. The analyst 235 may revise the inference paths or add new ones to the rule repository 220.

The IPEE 225 may use the resulting inference paths in an online mode to perform inference and generate explanations for topics of interest. The IPEE 225 may monitor input queries and/or other user requests from a user 240 for one or more inference triggers (e.g., tags or semantic relations denoting topics of interest). In response to a determination that one or more triggers have found (i.e., triggered), the IPEE 225 may look up one or more inference paths that correspond to the found one or more triggers and may apply these inference paths to the knowledge graph 215. The IPEE 225 may record the results of these inference paths and which inference paths apply to which results. The IPEE 225 may generate natural languages explanation for the found inference paths and/or results.

Figure 3:
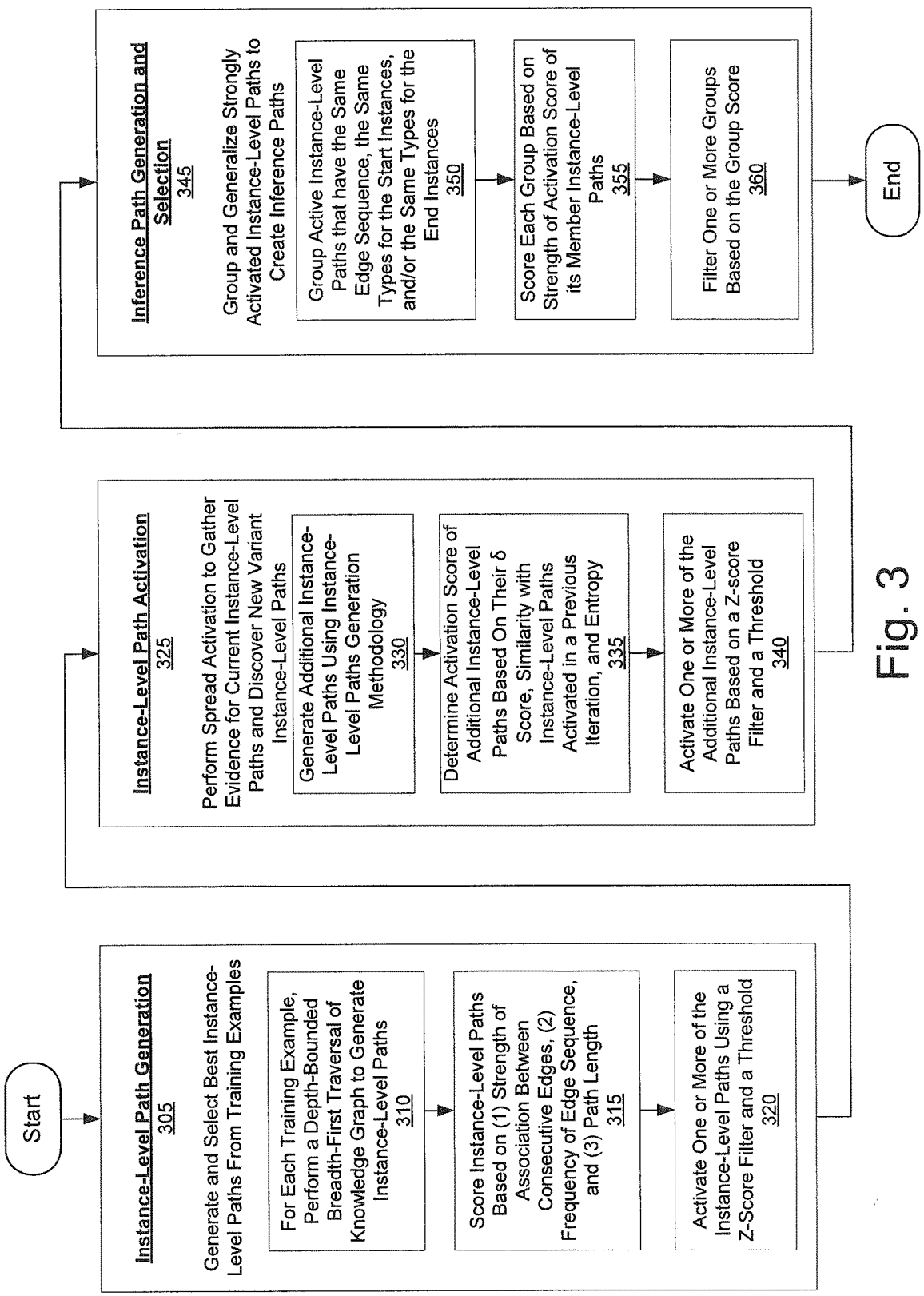
FIG. 3 illustrates a flowchart of a method for mining inference paths in accordance with one or more illustrative aspects discussed herein.

FIG. 3 illustrates a flowchart of an example of a method for mining inference paths in accordance with one or more illustrative aspects discussed herein. In one or more embodiments, the method of FIG. 3 and/or one or more steps thereof may be performed by a computing device (e.g., the data server 103, the web server 105, the client computers 107, 109, and/or any other computing device). In some embodiments, the method illustrated in FIG. 3 and/or one or more steps thereof may be embodied in computer-executable instructions that are stored in a computer-readable medium, such as non-transitory computer-readable memory.

As seen in FIG. 3, the method may begin at step 305 in which a knowledge scaling system may generate and select best instance-level paths from training examples by performing steps 310-320.

In step 310, the knowledge scaling system may, for each training example, perform a depth-bounded breadth-first traversal of knowledge graph to generate instance-level paths. For example, in step 310, IPME 210 may receive knowledge graph 215 (e.g., an ontology), which may be a directed, labeled graph including multiple nodes connected by multiple edges. The nodes may represent entities (e.g., concepts, etc.) and may be associated with corresponding types (e.g., types of object, classes associated with a collection of objects, etc.). In some embodiments, the entities may be typed. For example, "John Doe" is a basketball player and a person. The edges may represent semantic relations between these entities. The edges (e.g., relations) may include domain constraints, range constraints, relationships between entities (e.g., acted in, born at, etc.) and the inverses of these relations.

In some embodiments, knowledge graph 215 may include a subsumption hierarchy for entities and/or edges. For example, a class or type (e.g., a superclass or supertype) may be subsumed by another class or type (e.g., a subclass or subtype). Alternatively, in some embodiments, knowledge graph 215 might not have a subsumption hierarchy. For example, the types associated with the entities might not have a subsumption hierarchy. Additionally or alternatively, in some embodiments, the semantic relations might not have a subsumption hierarchy.

Additionally, the IPME 210 may also receive a set of training examples 205 on a topic of interest. The training examples 205 may include a set of instance pairs and/or their types for a topic of interest. An instance may be, for example, a member of a class, a concrete object, individuals (e.g., utterances of words and/or numbers), or the like. For example, a topic of interest may include an occupation of characters in novels. A training example may include the instance pair "spy" (e.g., a first instance) and "An American spy" (e.g., a second instance). Each instance may have a specific type. In this example, the type (e.g., a first type) of the instance "spy" may be an occupation and the type (e.g., a second type) of the instance "The Race" may be a novel. As can be seen from the example, the instance pairs might not include the same word(s). For example, the novel entitled "The Race" might not include the term "spy." The training examples 205 may be represented as:

$$D=\{<x,T_x,y,T_y>, \ldots\}$$

where D represents the training examples 205, x and y represent the instances, and $T_x$ and $T_y$ represent the respective types of x and y.

For each training example 205 (i.e., $D_i$), the IPME 210 may perform a depth-bounded breadth-first traversal of knowledge graph 215 to generate a set of instance-level paths (also referred to herein as hypotheses). An instance-level path may be a path through knowledge graph 215 with each node in the path representing an instance of a node of knowledge graph 215. The depth-bounded breadth-first traversal of knowledge graph 215 may be performed by starting at x and determining instance-level paths leading to y. For example, an instance-level path may include start instance x, end instance y, and one or more traversed intermediate instances of entities and/or relations traversed to form a path through knowledge graph 215 from start instance x to end instance y. As a result of applying the training examples 205 to the knowledge graph 215, the IPME 210 may produce a set of instance-level paths from x to y with a length less than or equal to the depth-bound.

In some embodiments, IPME 210 may constrain the traversal of knowledge graph 215 from start instance x to end instance y by not permitting immediate traversal of an inverse of an edge. For example, an edge may express a directed relationship pointing from a first entity to a second entity (e.g., the relation "parent of" may express the fact that the first entity is the parent of the second entity). An inverse edge may express a relationship that is the semantic equivalent of the original edge but in the opposite direction (e.g., the relation "child of"). In other words, the inverse edge may express the same semantic relationship, but may point from the second entity to the first entity. Thus, when the IPME 210 traverses knowledge graph 215 from the first entity to the second entity along an edge to create a first portion of an instance-level path, the IPME 210 might not allow and/or may otherwise prevent traversal from the second entity to the first entity along an inverse edge for a second portion of the path sequentially subsequent to the first portion.

In some embodiments, IPME 210 may constrain the traversal of knowledge graph 215 from start instance x to end instance y by not permitting cycles to occur. In some embodiments, the IPME 210 may filter and/or otherwise remove instance-level paths containing previously traversed nodes to enforce such a constraint.

In some embodiments, IPME 210 may constrain the traversal of knowledge graph 215 from start instance x to end instance y by not permitting traversal of type generalization edges because generalization may lead to incorrect inferences. For example, IPME 210 may prevent traversal from a first entity to a second entity using an edge associated with type generalization (e.g., an edge not specific to a type).

In step 315, the IPME 210 may score (referred to herein as a δ score) each instance-level path based on preferences for strongly associated edges, frequently occurring edge sequences, and/or shorter path lengths using the following algorithmic formula:

$$\delta(h^{(i)}_{x,y}) = \frac{1}{|h^{(i)}_{x,y}| - 1} \sum_{(e_i e_j) \in E(h^{(i)}_{x,y})} \mathbb{1}(\chi^2 \le p)\phi_c(e_i, e_j) + \alpha\varsigma(U(h^{(i)}_{x,y})) - \beta\varsigma(|h^{(i)}_{x,y}|)$$

where $h^{(i)}_{x,y}$ represents the ith instance-level path from start instance x to end instance y, $\delta(h^{(i)}_{x,y})$ represents a score of a particular instance-level path, $\|(x^2 \le p)\phi_c(e_i,e_j)$ represents a measurement of the association between a pair of consecutive edges of the particular instance level path, $\alpha\varsigma(U(h^{(i)}_{x,y}))$ represents a weighted measurement of the frequency of an edge sequence of the particular instance-level path across one or more (e.g., all) instance-level paths from start instance x to end instance y, and $|h^{(i)}_{x,y}|$ represents a measurement of the path length of the particular instance-level path based on the number of edges. $E(h^{(i)}_{x,y})$ represents the sequence of edges from start instance x to end instance y, and $(e_i,e_j)$ represents a pair of consecutive edges in the sequence.

The δ score may reflect a preference for instance-level paths with strongly associated edges because stronger associations may indicate a deeper sematic relationship between the entities they connect. For example, all other preferences being equal, a first instance-level path may receive a δ score greater than a δ score of a second instance-level path when a measure of the strength of overall association between each of the consecutive edge pairs of the first instance-level path is greater than a measure of strength of overall association between each of the consecutive edge pairs of the second instance-level path.

As mentioned above, the preference (e.g., higher scoring) for inference paths having a strong association of edges may be represented by $\|(x^2 \le p)\phi_c(e_i,e_j)$, which may measure the association between a pair of consecutive edges. For example, $\phi_c(e_i,e_j)$ may represent Cramer's V based on the $x^2$ associated value between $e_i$ and $e_j$. The following table illustrates a contingency table setup for computing the $x^2$ association value.

| Frequency $e_i$ and $e_j$ occur together across one or more (e.g., all) paths from x to y. | Frequency $e_i$ occurs without $e_j$ across one or more (e.g., all) paths from x to y. |
|---|---|
| Frequency $e_j$ occurs without $e_i$ across one or more (e.g., all) paths from x to y. | Frequency $e_i$ and $e_j$ might not occur together across one or more (e.g., all) paths from x to y. |

$\|(x^2 \le p)$ may indicate whether the resulting $x^2$ association value is above or below a predetermined threshold significance level p. For example, $\|(x^2 \le p)$ may return a value of 1 when $x^2$ exceeds a predetermined significance level and may return a value of 0 otherwise (e.g., when $x^2$ might not exceed a predetermined significance level). Based on the foregoing statistical analysis, the IPME 210 may compute the overall association for an instance-level path by averaging overall consecutive edge pairs. As a result, the IPME 210 may filter and/or otherwise remove instance-level paths with a low score thereby filtering instance-level paths having spurious or weak associations.

The δ score may reflect a preference for instance-level paths with frequently occurring edge sequences because this may indicate that an instance to which the edge sequence relates is more important. For example, a first instance-level path may have an edge sequence (i.e., one or more edges), between at least two instances, that occur at a first frequency. A second instance-level path may have an edge sequence (i.e., one or more edges), between at least two instances, that occur at a second frequency. As will be discussed in detail below, all other preferences being equal, the first instance-level path may receive a δ score greater than a δ score of the second instance-level path when the first frequency is greater than the second frequency.

As mentioned above, the preference (e.g., higher scoring) for inference paths having an edge sequence between two instances with high frequency may be represented by $\alpha\varsigma(U$ ($h^{(i)}_{x,y}$)), which measures the frequency of the edge sequence of a current instance-level path across one or more (e.g., all) paths from start instance x to end instance y. A δ score of an instance-level path may be increased for frequently occurring edge sequences. For example, $U(h^{(i)}_{x,y})$ may represent a number of paths from start instance x to end instance y that have the same sequence of edges as the current instance-level path. $\zeta(U(h^{(i)}_{x,y}))$ may represent a sigmoid function scaled appropriately between e.g., 0 and 1. α may represent a weight on the term so as to place more or less emphasis on this preference relative to the other preferences. As a result, the IPME 210 may filter and/or otherwise remove instance level paths having a low δ score thereby filtering instance-level paths with a lower frequency of edge sequences.

The δ score may reflect a preference for instance-level paths with shorter path lengths because almost any node in a large knowledge graph (e.g., knowledge graph 215) may be reached from and/or connected to another node by traversing enough edges. As will be discussed in detail below, all other preferences being equal, a first instance-level path may receive a δ score greater than a δ score of a second instance-level path when the first instance-level path has a path length less than a path length of the second instance-level path. A path length may be based on a number of traversed entities and/or edges from start instance x to end instance y.

As mentioned above, the preference (e.g., higher scoring) for inference paths having shorter lengths may be represented by $|h^{(i)}_{x,y}|$, which measures the length of an inference-level path in terms of edges. As a result, a δ score of an instance-level path may be decreased based on having a longer length. $\zeta(|h^{(i)}_{x,y}|)$ may represent a sigmoid function scaled appropriately between e.g., 0 and 1. β may represent a weight on the term in order to permit the IPME 210 to place more or less emphasis on this preference relative to the other preferences in the δ score. As a result, the IPME 210 may filter and/or otherwise remove instances with a low score thereby filtering instance-level paths having longer path lengths.

In step 320, the IPME 210 may select one or more of the instance-level paths (i.e., hypotheses) for activation using a Z-score filter and/or a threshold measure. For example, in step 320, once the IPME 210 has determined a δ score for each of the instance-level paths generated from the training examples 205, the IPME 210 may activate a particular instance-level path based on a Z-score (determined from the δ score) being greater than or equal to a threshold, which may be represented as:

$$C^{(0)} = \{h^{(i)}_{x,y} | h^{(i)}_{x,y} \in G(D) \, s.t. \, z(\delta(h^{(i)}_{x,y})) \geq L_P\}$$

where G(D) may represent the process of generating instance-level paths from the training examples 205, $z(\delta(h^{(i)}_{x,y}))$ may represent the Z-score, $L_P$ may represent the threshold specified in terms of the standard deviation, and $C^{(0)}$ may represent the resulting activated instance-level path. The term s.t. may be an abbreviation for the term "such that." The IPME 210 might not consider the nodes (i.e., instances and their types) during instance-level paths generation of step 305 in order to reduce sparsity.

Because the δ scores across multiple instance-level paths may exhibit a normal distribution (e.g., a bell curve distribution), the IPME 210 may select the best instance-level paths based on the Z-score rather than an absolute cutoff (e.g., top N number of instance-level paths). For example, the IPME 210 may filter instance-level paths that might not have a Z-score above the predetermined threshold $L_P$ and may select instance-level paths that have a Z-score above the predetermined threshold $L_P$. Additionally or alternative, in some embodiments, the IPME 210 may select a top predetermined number of instance-level paths ranked by their δ score.

The IPME 210 may activate the resulting instance-level path in $C^{(0)}$ and may assign the instance-level path a default activation score. In some embodiments, analyst 235 may assign the default activation score.

In step 325, the knowledge scaling system may iteratively perform spread activation to gather evidence on currently selected/activated instance-level paths and may discover new variant instance-level paths by performing steps 330-340. The evidence gathered may be in the form of additional instance-level paths that have the same edge sequence as the currently selected/activated instance-level paths, also referred to as hypotheses. Additionally, the knowledge scaling system may iteratively discover new variant instance-level paths. For example, the knowledge scaling system may generate a second set of instance-level paths from an activated/selected subset of a first set of instance-level paths. The knowledge scaling system may activate/select a subset of the second set of instance-level paths and may, from the activated/selected subset of the second set of instance-level paths, generate a third set of instance-level paths. The knowledge scaling system may activate/select a subset of the third set of instance-level paths and may, from the activated/selected subset of the third set of instance-level paths, generate a fourth set of instance-level paths, and so on and so forth as will be described in detail below.

In step 330, the knowledge scaling system may iteratively generate additional instance-level paths (e.g., additional hypotheses) using the instance-level paths generation methodology of steps 305-320. For example, in step 330, the IPME 210 may generate additional instance-level paths using a process similar to the one used to generate $C^{(0)}$ (e.g., the currently activated instance-level paths) discussed above. For example, for each iteration, IPME 210 may determine one or more (e.g., all) unique start and end types of respective start and end instances from the previous set of instance-level paths $C^{(t-1)}$. Initially, the set of instance-level paths may be the activated instance-level paths $C^{(0)}$. The IPME 210 may then determine one or more (e.g., all) instances of these start and end types but might not determine instances from $C^{(t-1)}$. The IPME 210 may perform another depth-bounded breadth-first traversal to find additional instance-level paths from instances of the start type to instances of the end type via e.g., various heuristics. For example, the IPME 210 may determine each of the instances of the knowledge graph that have not been previously used to generate instance-level paths and that are of the same type as the start instances. Similarly, the IPME 210 may determine each of the instances of the knowledge graph that have not been previously used to generate instance-level paths and that are of the same type as the end instances. The IPME 210 may then determine instance-level paths that begin at the determined instances that have the same type as the start instances of the previous set of instance-level paths and end at the determined instances that have the same type as the end instances of the previous set of instance-level paths.

The IPME 210 may score each additional instance-level path using the δ formula of step 315 to account for preferences for instance-level paths having a strong associating of edges, a high frequency of edges between two instances, and a short path length. In some instances, the IPME 210 may filter the additional instance-level paths with a low δ score using the same criteria discussed above.

In step 335, the knowledge scaling system may determine an activation score (also referred to herein as a k score) of each additional instance-level path based on their $\delta$ score, their similarity with previously activated instance-level paths, and entropy. For example, the IPME 210 may select one or more of the additional instance-level paths for activation. For example, the IPME 210 may activate additional instance-level paths with a high activation score k (e.g., an activation score above a predetermined threshold). The activation score of a particular additional instance-level path may be based on its $\delta$ score, its similarity with previously activated instance-level paths, and entropy to promote diversity among the activated instance-level paths. The k score may be determined using the following formula:

$$\kappa(h^{(j)}_{x,y}) = \delta(h^{(j)}_{x,y}) + \alpha \sum_{h^{(i)}_{x',y'} \in C(i-1)} \mathbb{1}(\tau \le p) w_{h^{(j)}_{x,y}, h^{(i)}_{x',y'}} \delta(h^{(i)}_{x',y'}) + \beta H(C'^{(t-1)})$$

The first term (e.g., the $\delta(h^{(j)}_{x,y})$ term) may be the $\delta$ score of the additional instance-level path, which represents a preference for instance-level paths with strongly associated edges, frequently occurring edge sequences, and shorter path lengths as discussed above. The second term (e.g., the $\Sigma \|(\tau \le p)^\omega h^{(j)}_{x,y}, h^{(i)}_{x',y'} \delta(h^{(j)}_{x',y'})$ term) may represent a measurement of a degree of similarity of the particular additional instance-level path (e.g., $h^{(j)}_{x,y}$) to instance level paths activated during the previous iteration (e.g., $C^{(t-1)}$) while also accounting for the $\delta$ score. The third term (e.g., the $\beta H(C'^{(t-1)})$) may represent entropy (e.g., the diversity of the edge sequence of all applicable instance-level paths (i.e., instance-level paths whose start instance and end instance have the same type as the start instance and end instance of the current instance level path being considered) activated during the previous iteration). $h^{(j)}_{x,y}$ may represent the jth additional instance-level path from start instance x to end instance y.

The second term measuring the similarity of the particular instance-level path to instance-level paths activated during the previous iteration may include the term $^\omega h^{(j)}_{x,y}, h^{(i)}_{x',y'}$, which may be abbreviated $W_{N,M}$ or simply w and may be represented as:

$$\gamma(h^{(j)}_{x,y}, h^{(i)}_{x',y'}) \left( \frac{n_c - n_d}{\frac{1}{2}n(n-1)} \right)$$

where $n_c$ may represent the number of coordinate edges between two instance-level paths (observing the edge sequence), $n_d$ may represent the number of disordinate edges, and n may represent the sum of $n_c$ and $n_d$. The IPME 210 may determine that two instance-level paths include one or more coordinate edges when, for example, the first edge connecting the start instance x in the instance-level path $h^{(j)}_{x,y}$ is the same as the first edge connecting the start instance x' in the instance-level path $h^{(i)}_{x',y'}$. The IPME 210 may determine that two instance level paths include one or more disordinate edges when, for example, the last edge connecting the last instance y in the instance-level path $h^{(j)}_{x,y}$ is not the same as the last edge connecting the last instance y' in the instance-level path $h^{(i)}_{x',y'}$.

Using $n_c$ and $n_d$, the IPME 210 may compute Kendall's $\tau$ to determine and/or otherwise measure the association between the edge sequences of the two instance-level paths.

Kendall's $\tau$ may be less than or equal to predetermined threshold p. The IPME 210 may use Kendall's $\tau$ to filter spurious (e.g., dissimilar) associations by not activating instance-level paths having a similarity below the predetermined threshold p. As a result, the IPME 210 may penalize instance-level paths that may be dissimilar to previously activated instance-level paths to reduce spurious activations.

$\gamma(h^{(j)}_{x,y}, h^{(i)}_{x',y'})$ may be represented by the following formula:

$$\gamma(h^{(j)}_{x,y}, h^{(i)}_{x',y'}) = \begin{cases} 1 & \text{if } T^{(i)}_{x'} = T^{(j)}_{x} \text{ and } T^{(i)}_{y'} = T^{(j)}_{y} \\ 0 & \text{otherwise} \end{cases}$$

In other words, $\gamma(h^{(j)}_{x,y}, h^{(i)}_{x',y'})$ may return a 1 if the types of the corresponding start and end instances between two instance-level paths are the same, and 0 otherwise. As a result, $\gamma(h^{(j)}_{x,y}, h^{(i)}_{x',y'})$ may limit the computation to applicable instance-level paths from $C^{(t-1)}$. The IPME 210 might not consider and/or otherwise enforce the types of internal nodes (nodes between x and y) to reduce sparsity. In embodiments where a subsumption hierarchy exists, the IPME 210 may allow a subsumption relationship between the types instead of strict equality. $\alpha$ may represent a weight on the measurement of similarity in order to permit the IPME 210 to place more or less emphasis on the measurement of similarity in the overall k score relative to the $\delta$ and the entropy measurement.

The third term (e.g., the $\beta H(C'^{(t-1)})$) may represent the diversity of the particular instance-level path from the instance-level paths of the previous iteration by measuring the entropy $\beta H(C'^{(t-1)})$) across the edge sequence of one or more (e.g., all) applicable instance-level paths from the previous iteration $\beta H(C'^{(t-1)})$. $\beta$ may represent a weight on the entropy measurement in order to permit the IPME 210 to place more or less emphasis on the entropy measurement in the overall k score relative to the $\delta$ and the measurement of similarity.

In step 340, the IPME 210 may activate one or more of the additional instance-level paths using a Z-score filter and a threshold. For example, in step 340, once the IPME 210 computes the activation score k for each instance-level path, the IPME 210 may then select which instance-level paths to activate using the following formula:

$$C^{(t)} = \{h_{x,y}^{(j)} | h_{x,y}^{(j)} \in G'(C^{(t-1)}) s.t. z(\kappa(h_{x,y}^{(j)})) \ge \lambda(t) L_A\}$$

where $G'(C^{(t-1)})$ represents the process of generating additional instance-level paths from active instance-level paths from the previous iteration, $z(k(h^{(j)}_{x,y}))$ may represent the Z-score determined using the k score, the $L_A$ may represent a threshold specified in terms of the standard deviation, and the $\lambda(t)$ may represent an inverse decay on $L_A$. Because the activation scores k may exhibit a normal distribution (e.g., a bell curve distribution), the IPME 210 may use the Z-score filter $z(k(h^{(j)}_{x,y}))$ and might not use an absolute cutoff value. In some embodiments, the IPME 210 may use a predetermined cutoff value of the activation scores k. The inverse decay $\lambda(t)$ may cause $L_A$ to increase with each iteration. The term s.t. may be an abbreviation for the term "such that." For example, $\lambda(t)$ may be represented by the following formula (where d may represent the decay rate):

$$1 + d^{-1} \log(t+1)$$

As a result, the IPME 210 may select and activate a particular additional instance-level path when its Z-score is greater than or equal to the inverse decay $\lambda(t)$ multiplied by the threshold $L_4$. Otherwise, the IPME 210 may filter and/or otherwise not select the particular instance-level path if its Z-score is less than the inverse decay $\lambda(t)$ multiplied by the threshold $L_4$.

The IPME 210 may use the activated instance-level paths $C^{(t)}$ as the starting point for the next iteration and may repeatedly perform iterations (e.g., by repeating steps 325-340) until a maximum number of iterations is reached and/or until convergence (i.e., no active instance-level paths are generated during the current iteration). In some instances, the maximum number of iterations may be specified by analyst 235.

Figure 4:
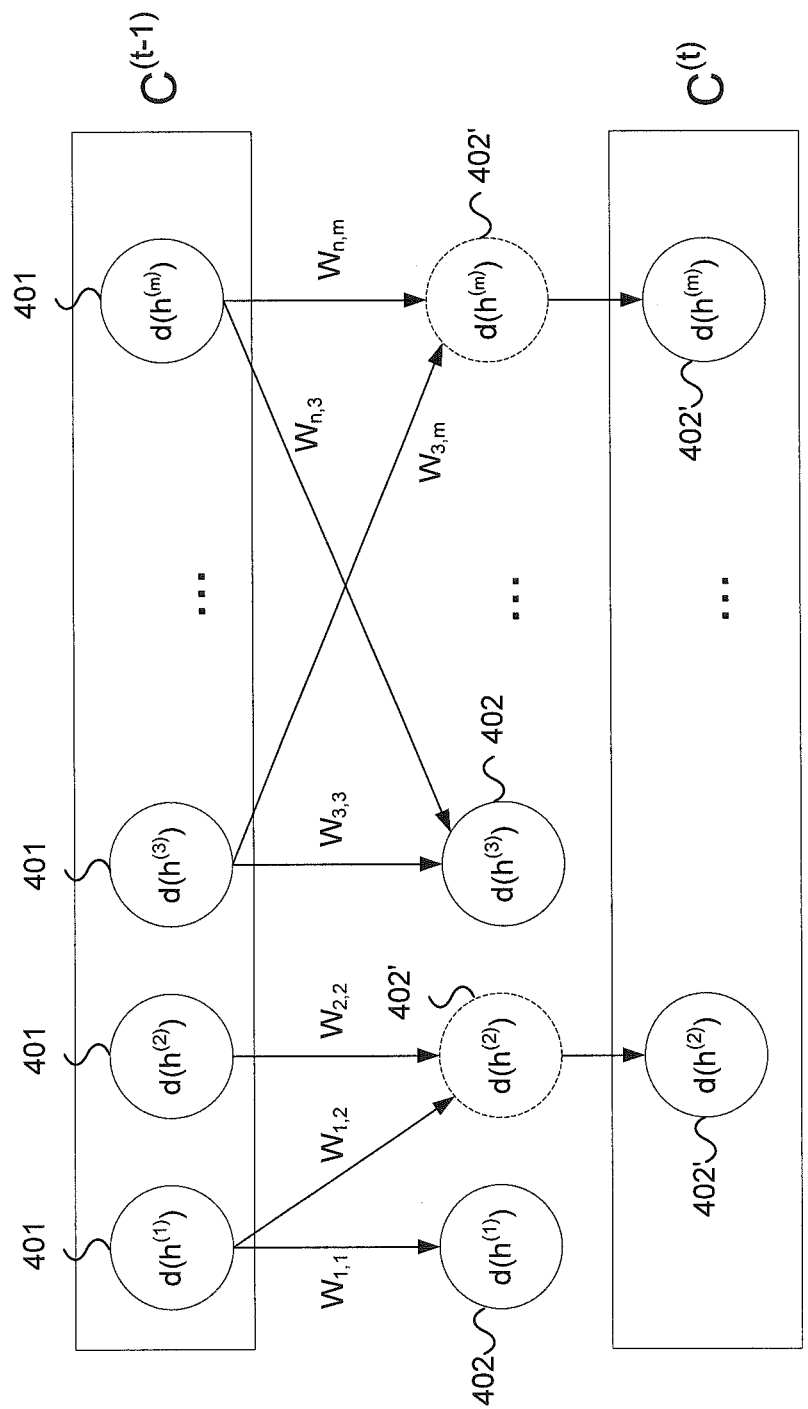
FIG. 4 illustrates an example of a schematic of an activation process in accordance with one or more illustrative aspects discussed herein.

FIG. 4 illustrates an example of a schematic of an activation process in accordance with one or more illustrative aspects discussed herein. As shown, for each iteration, the IPME 210 may, using instance-level paths 401 from the previous iteration $C^{(t-1)}$, perform a depth-bounded breadth-first traversal to find additional instance-level paths 402 from instances of the start type to instances of the end type via e.g., various heuristics. $W_{N,M}$ may be an abbreviation of $^{\omega}h\ h^{(j)}_{x,y}, h^{(i)}_{x',y'}$ described above. The term d may represent the $\delta$ score for each instance-level path described above in step 315. The IPME 210 may calculate a k score for each of the additional instance-level paths 402 in this current iteration. The IPME 210 may then select a set 402' of the instance-level paths 402 for activation when the activation score k for the instance-level path has a Z-score greater than or equal to the inverse decay $\lambda(t)$ multiplied by threshold $L_4$. The IPME 210 may now use the selected/activated instance-level paths 402' (e.g., $C^{(t)}$) as the starting point for the next iteration. For example, the set $C^{(t)}$ may now become $C^{(t-1)}$ for the next iteration. The IPME 210 may continue to iterate until a user-set maximum number of iterations is exceeded or until convergence (e.g., no active instance-level paths are generated during the current iteration).

In step 345, the knowledge scaling system may perform inference path generation and selection by performing steps 350-360. For example, as shown in FIG. 5, the IPME 210 may group 501 strongly activated instance-level paths 502 (i.e., active hypotheses) and may generalize the group 501 to create an inference path 503. The IPME 210 may then select the best inference paths 503 for storage in the rule repository 220.

In step 350, the IPME 210 may form a group 501 of one or more active instance-level paths 502 that have the same edge sequence, the same types for the start instances, and/or the same types for the end instances.

A first criterion for grouping may be that the instance-level paths 502 have the same edge sequence for at least a portion of the instance-level paths 502. For example, in FIG. 5, instance-level path 502a and instance-level path 502b have the same edge sequences, namely the "occupation of" edge is followed by the "portrayed in" edge in both instance-level paths 502a,b. As a result of having the same edge sequence, assuming other grouping criteria is met, the IPME 210 groups instance-level paths 502a,b into group 501.

In some embodiments, the IPME 210 may only group paths together when the entire sequential edge sequence of an instance-level path is the same as the entire sequential edge sequence of another instance level path. In such embodiments, the IPME 210 might not group instance-level paths having the same edges in a different sequential order. In such embodiments, the IPME 210 might not group together instance-level paths when at least one of the instance-level paths has an edge not found in the other instance-level path.

A second criterion for grouping may be that the respective start instances of the instance-level paths 502 have the same type. For example, in FIG. 5, start instance "spy" of instance-level path 502a may have the type constraint of occupation and start instance "banker" of instance-level path 502b may have the same type constraint of occupation. As a result, assuming other grouping criteria is met, the IPME 210 may group instance-level paths 502a,b together into group 501. If the type of the start instance of an instance-level path does not match the type of the start instance of another instance-level path, the IPME 210 might not group those instance-level paths together.

A third criterion for grouping may be that the respective end instances of the instance-level paths 502 have the same type. For example, in FIG. 5, end instance "novel" of instance-level path 502a may have the type constraint of fiction and end instance "novel" of instance-level path 502b may have the same type constraint of fiction. As a result, assuming other grouping criteria is met, the IPME 210 may group instance-level paths 502a,b together into group 501. If the type of the end instance of an instance-level path does not match the type of the end instance of another instance-level path, the IPME 210 might not group those instance-level paths together.

In circumstances when the knowledge graph 215 has a subsumption hierarchy, the IPME 210 may relax the second and third criterion from a strict matching of types to subsumption. As a result, for the second criterion, the IPME 210 may, assuming other criterion is met, group two or more instance-level paths together even if the respective types of the start instances do not strictly match but are a supertype or subtype of one another. For the third criterion, the IPME 210 may, assuming the other criterion is met, group two or more instance-level paths together even if the respective types of the end instances do not strictly match but are a supertype or subtype of one another. For example, corresponding start instances may have a common ancestor that might not be $\top$. Similarly, corresponding end instances may have a common ancestor that might not be be $\top$. $\top$ may represent the most general concept or type that one or more (e.g., all) other types eventually generalize to (i.e., $\top$ is the root of the subsumption hierarchy).

Additionally or alternatively, in some embodiments, in cases where a subsumption hierarchy exists, the IPME 210 may generalize each internal node in the active instance level paths placed into the same group by finding and/or otherwise determining the most specific generalization of the corresponding instances. For example, if Fido is an instance of type Dog and Dog is subtype of Animal, and Whiskers is an instance of type Cat and Cat is a subtype of Animal, then Animal is most specific generalization of Fido and Whiskers. In cases where a subsumption hierarchy might not exist, the IPME 210 might not impose any type constraint on the internal nodes. The types of the internal nodes of the instance-level paths between a start node and an end node may be ignored when generalizing the instance-level paths into inference paths.

For each group, IPME 210 may create an inference path for the group by generalizing the member instance-level paths. For example, the inference path may satisfy criterion for grouping the member instance-level paths. For example, the inference path may include the same edge sequence as each of the member instance-level paths of the group. Additionally, the inference path may have a node corresponding to each instance of each of the member instance-level paths. In some embodiments, each node of the inference path may have the same type constraint as the type constraint of the corresponding instances of the member instance-level paths. Additionally or alternatively, in some embodiments, at least the first node and the end node of the inference path may have the same respective type constraints as each first instance and each end instance of the member instance-level paths. The nodes and edges of the inference path may have the same sequential sequence for instances and edges of each of the member instance-level paths.

In step 355, the IPME 210 may, for each group, determine a group score s based on the strength of the activation scores k of the group's member instance-level paths to determine the quality of the group's inference path. In order to avoid a "trickling" effect where a large number of weak instance-level paths get activated over multiple iterations but appear stronger in the aggregate, the IPME 210 may use the following scoring formula:

$$s(g_k) = \frac{\ln\left(1 + \sum_{h_{x,y}^{(i)} \in g_k} \kappa(h_{x,y}^{(j)})\right)}{\left(1 + \frac{1}{4n}\right)\frac{\sigma_{g_k}}{\mu_{g_k}}}$$

where $g_k$ represents a particular group, $\sigma_{g_k}$ may represent the standard deviation over the activation scores $k(h^{(i)}_{x,y})$ in the group $g_k$, n may represent the number of member instance-level paths in the group $g_k$, and $\mu_{g_k}$ may represent the mean of the activation scores of the member instance-level paths h $h^{(j)}_{x,y}$ in the group $g_k$. The denominator may serve as a dispersion measure to avoid the above described "trickling" effect by preferring groups where the instance-level paths are activated by the same iteration.

In step 360, the IPME 210 may filter groups that do not have a group score s that exceeds a threshold value (i.e., have a group score s that is below the threshold value). The threshold value may be specified by analyst 235. The IPME 210 may also filter inference paths associated with the filtered groups. The IPME 210 may then store the inference paths (e.g., inference path 503) of the remaining groups (e.g., the unfiltered groups) and the inference paths' group score s in rule repository 220.

Figure 6:
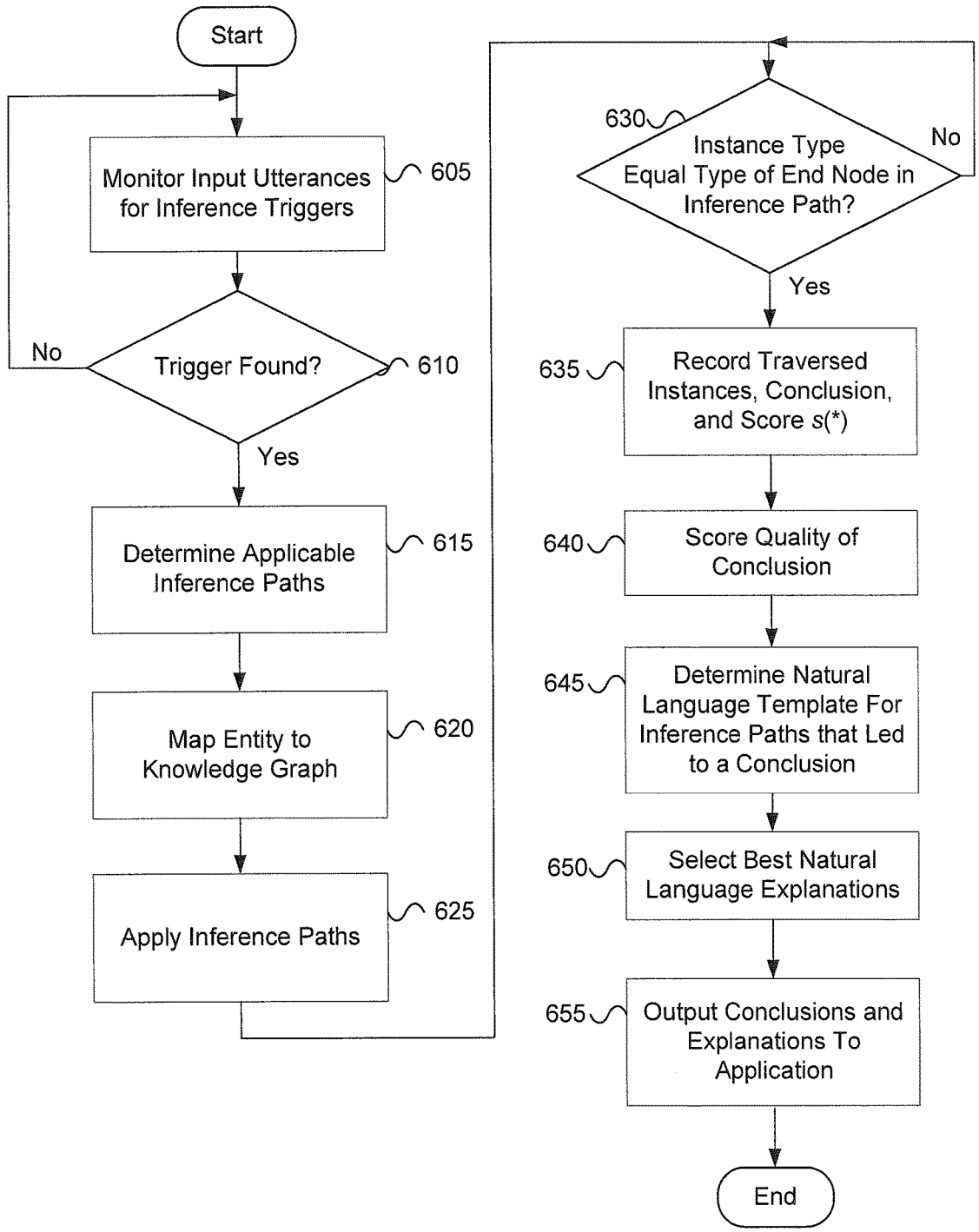
FIG. 6 illustrates a flowchart of a method for performing inferences on topics of interest and generating natural language explanation in accordance with one or more illustrative aspects discussed herein.

FIG. 6 illustrates a flowchart of a method for performing inferences on topics of interest and generating natural language explanation in accordance with one or more illustrative aspects discussed herein. In one or more embodiments, the method of FIG. 6 and/or one or more steps thereof may be performed by a computing device (e.g., the data server 103, the web server 105, the client computers 107, 109, and/or any other computing device). In some embodiments, the method illustrated in FIG. 6 and/or one or more steps thereof may be embodied in computer-executable instructions that are stored in a computer-readable medium, such as non-transitory computer-readable memory.

As seen in FIG. 6, the method may begin at step 605 in which IPEE 225 may monitor input utterances for inference triggers. For example, in step 605, the IPEE 225 may receive user requests from the natural language understanding module 230. The natural language understanding module 230 may, in response to receiving an input utterance from the user 240, generate user requests representing the input utterance of the user 240 and send the user requests to the IPEE 225. The IPEE 225 may, using the rule repository 220 of inference paths, determine whether the user request (and/or input utterance) has triggered one or more of the stored inference paths based on inference triggers. The inference triggers may be stored at the rule repository 220 and/or the IPEE 225.

The inference triggers may be semantic tags corresponding to topics of interest produced by a name entity recognizer (NER) or logical forms produced by a linguistics pipeline. For example, the semantic tags may be types (e.g., occupation, event, etc.) in knowledge graph 215 that a NER may use to mark phrases in the utterance denoting instances these types. For example, the utterance "show me fictional novels with spies" may be augmented with by the NER as follows: "show me fictional novels with [Occupation] spies [/Occupation]." As a result, IPEE 225 may monitor input utterances for the occupation tag.

In step 610, IPEE 225 may determine whether one or more inference triggers have been found in an input utterance and/or user request. For example, in step 610, the IPEE 225 may, in response to a determination that no triggers have been found in an input utterance, continue monitoring for input utterance for inference triggers. The IPEE 223 may, in response to a determination that one or more inference triggers have been found, perform steps 615-655.

In step 615, in response to a determination that one or more triggers have been found in the input utterance and/or user request, IPEE 225 may determine one or more applicable inference paths associated with the found triggers. For example, in step 615, the IPEE 225 may determine and collect one or more (e.g., all) inference paths associated with the found triggers from the rule repository 220. An inference path may be associated with a trigger if the start type of the inference path is equal to (e.g., matches) the semantic tag and/or other logical form. In some embodiments, the IPEE 225 may relax the strict matching to subsumption if the knowledge graph 215 supports a subsumption hierarchy. For example, an inference path may be associated with a trigger when the start type of the inference path does not strictly match the semantic tag but a supertype or subtype of the start type matches the semantic tag.

In step 620, IPEE 225 may map a surface form of an entity associated with the input utterance and/or user request to the corresponding instance in knowledge graph 215. For example, in step 620, the IPEE 225 may detect an entity associated with the input utterance and/or user request. The IPEE 225 may map a surface form of the detected entity (e.g., spy) to the corresponding instance in knowledge graph 215. A surface form may be text or other data referring to the detected entity. For example, the IPEE 225 may perform a fuzzy match between the surface from of the detected entity and the names and aliases of one or more (e.g., all) instances of the target type in knowledge graph 215. The target type may be the type (including its supertypes and subtypes) specified by or associated with the semantic tag.

In step 625, IPEE 225 may apply each of the applicable inference paths to an instance in the knowledge graph 215. For example, in step 625, IPEE 225 may apply an inference path by starting at a start instance for the detected entity and traversing the knowledge graph 215 guided by the inference path. For example, IPEE 225 may begin at the start instance and follow edges and nodes (e.g., entities) in knowledge graph 215 specified by the applicable inference path. The IPEE 225 may observe type constraints of each traversed node.

In step 630, IPEE 225 may determine, for each instance reached (e.g., traversed) in knowledge graph 215 guided by the applicable inference path, whether a type of the instance matches a type of an end node of the applicable inference path. In response to a determination that the type of the instance does not match the type of the end node of the inference path, IPEE 225 may continue to traverse knowledge graph 215 using the applicable inference path until a match is found. In response to a determination that the type of the instance matches the type of the end node of the inference path, process may continue to step 635.

In some embodiments, IPEE 225 might not reach an instance of knowledge graph 215 having a type matching (either strictly or under subsumption) a type of the end node of the applicable inference path. In such embodiments, IPEE 225 may remove the inference path from consideration and analyze other applicable inference paths. In cases where IPEE 225 may remove each of the applicable inference paths, IPEE 225 may return to step 605 to continue monitoring for inference triggers.

In step 635, in response to a determination that the type of the instance matches the type of the end node of the inference path, IPEE 225 may record the instance as the conclusion of applying the applicable inference path and each of the other traversed instances (e.g., the starting instance and the one or more intermediate instances traversed using the inference path). Additionally, in some embodiments, IPEE 225 may record the group score s associated with the applicable inference path.

In some embodiments, IPEE 225 may relax the strict matching to subsumption if knowledge graph 215 supports a subsumption hierarchy. For example, IPEE 225 may record the instance as the conclusion of the inference path when the type of the instance does not match the type of the end node of the inference path but the type of the instance is a subtype or a supertype of the end node of the inference path.

In step 640, IPEE 225 may score the quality of each conclusion by summing the scores of the one or more (e.g., all) inference paths that lead to the conclusion. In some embodiments, IPEE 225 may rank the conclusions based on their summed scores. Because each score denotes the quality of its inference path, the score may provide a proxy for the quality of the conclusion drawn from the inference path.

Steps 615-640 may be repeated for each inference trigger (e.g., semantic tag) detected on the input user utterances.

In step 645, IPEE 225 may determine natural language templates for inference paths that lead to the conclusion. For example, in step 645, IPEE 225 may, for each inference path that lead to a conclusion, use a natural language template corresponding to the inference path to generate a natural language explanation. In some embodiments, the template may be authored manually by analyst 235. In other embodiments, the template may be automatically learned by another processing system and/or may be generated by a set of rules that may be authored manually by analyst 235 and/or automatically learned by a different processing system.

Figure 7:
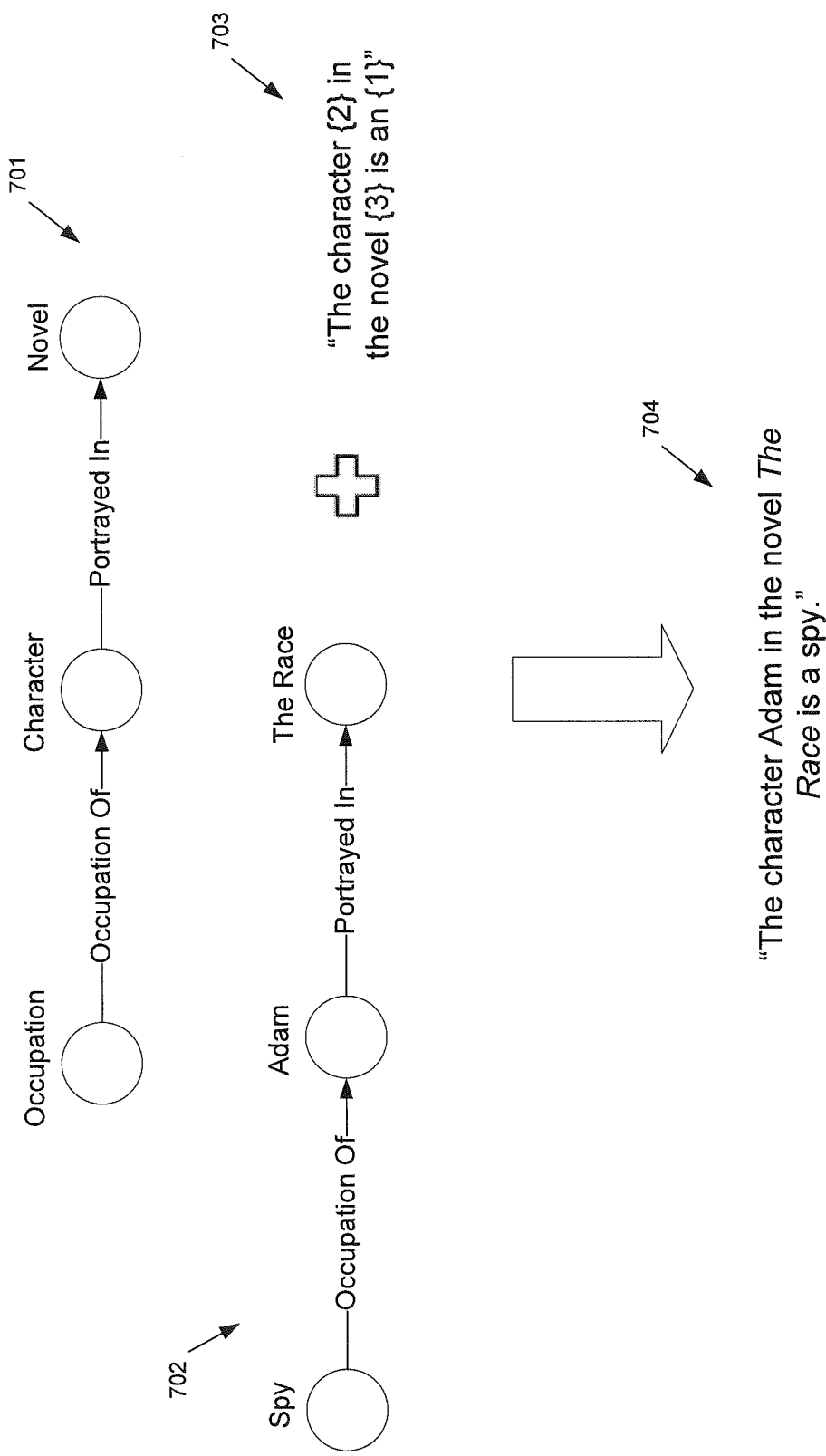
FIG. 7 illustrates an example of an explanation generated by instantiating an explanation template with an instantiated inference path.

IPEE 225 may instantiate the template with the instances of knowledge graph 215 traversed using the applicable inference path. FIG. 7 illustrates an example of an explanation generated by instantiating an explanation template with an instantiated inference path. Inference path 701 may be for the topic novels features an occupation of interest. IPEE 225 may instantiate the inference path 701 as a result of applying inference path 701 to knowledge graph 215. In other words, IPEE 225 may traverse knowledge graph 215 using inference path 701 and may record the traversed instances as an instantiated inference path 702. IPEE 225 may look up an explanation template 703 associated with the inference path 701 in a database (e.g., rule repository 220, a database local to the IPEE 225, etc.). The explanation template 703 may include indicators and/or tags (e.g., {N}) to indicate correspondences between the template 703 and nodes of the instantiated inference path 702. For example, the indicator {1} may correspond to the first node of instantiated inference path 702, the indicator {2} may correspond to the second node of the instantiated inference path 702, and the indicator {3} may correspond to the third node of the instantiated inference path 702, and so on. IPEE 225 may generate an explanation 704 by instantiating the explanation template 703 with the instantiated inference path 702. IPEE 225 may also apply linguistic rules such as, but not limited to, subject-verb agreement, count agreement, etc. to ensure that the instantiated explanation template is grammatical. In some embodiments, the linguistic rules may be store in a database local to IPEE 225.

In step 650, because multiple inference paths may lead to the same conclusion, the IPEE 225 may select the K best explanations for each conclusion to reduce verbosity. IPEE 225 may employ different strategies that can be configured at initialization time. For example, IPEE 225 may employ a first strategy that favors explanations derived from "strong" inference paths by selecting the top K explanations based on the group score s (discussed above in step 355) of the inference path corresponding to the explanation.

Additionally or alternatively, in some embodiments, the IPEE 225 may favor a second strategy that favors a diverse set of explanations for each conclusion by using the following formula:

$$\underset{e_i \in E_K(c)}{\mathrm{argmax}} H(e_i)$$

where $E_K(c)$ may represent the one or more (e.g., all) combinations of K explanations for a conclusion c, $e_i$ may represent the ith combination, and $H(e_i)$ may represent the entropy over the unique terms in $e_i$.

In step 655, IPEE 225 may output the conclusions and explanations to an appropriate application (e.g., the TV program discovery, virtual assistant, etc.). For example, the virtual assistant may use the conclusion and explanations to support topic-oriented search requests and to output (e.g., present, display, etc.) to user 240 a logically motivated explanation of why each conclusion is being shown. In some embodiments, the application might not show a link with word occurrences highlighted. In some embodiments, the application may be part of the knowledge scaling system. For example, the application may be part of the natural language understanding module 230.

The above-discussed embodiments provide a solution for utilizing large-scale knowledge graphs to enable inference at scale and natural language explanations of the conclusions (i.e., knowledge scaling). In some embodiments, aspects discussed herein improve database lookup by using the results to expand the constraints in a database query (e.g., further constrain a user request) to improve results precision. Further improvements to database lookup may be achieved by using the results to better align a database query with the target database. For example, constraints in the database query that do not map to any elements in the database may be replaced with results that do map to at least one element in the database to thereby improving recall. In some embodiments, aspects discussed herein improve keyword searches by using the results to expand the keyword terms. In some embodiments, aspects discussed herein improve inferences by augmenting the results of a logic-based inference engine.

In some embodiments, aspects discussed herein improve database lookup by using the results to expand and/or modify a database query.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Additionally, numerous other embodiments, modifications, variations within the scope and spirit of the appended claims may occur to persons of ordinary skill in the art from a review of this disclosure. Specifically, one or more of the features described herein may be combined with any or all of the other features described herein. The various features described above are merely non-limiting examples, and may be arranged, combined, subdivided, omitted, and/or altered in any desired manner.

What is claimed is:

1. An apparatus comprising:
a processor; and
a memory for storing computer readable instructions that, when executed by the processor, cause the apparatus to:
prior to receiving an utterance by a user, traverse a knowledge graph using training data comprising a plurality of start instances and a plurality of associated end instances to produce an initial set of instance-level paths, wherein each traversal of the knowledge graph begins at a start instance, of the plurality of start instances, and ends at an associated end instance of the plurality of ending instances;
generate a subsequent set of instance-level paths based on a subset of the initial set of instance-level paths, wherein the subsequent set of instance-level paths is different from the subset of the initial set of instance-level paths;
select a subset of the subsequent set of instance-level paths based on a Z-score of a respective instance-level path of the subsequent set of instance-level paths being greater than or equal to a threshold modified by an inverse decay;
generalize an inference path based on the subset of the initial set of instance-level paths and a-the subset of the subsequent set of instance-level paths;
associate a natural language explanation template with the inference path;
receive the utterance by the user; and
output a natural language explanation, wherein the natural language explanation is based on:
the utterance,
the natural language explanation template, and
the inference path.

2. The apparatus of claim 1, wherein the knowledge graph comprises a plurality of nodes connected by a plurality of relations.

3. The apparatus of claim 1, wherein the traversal of the knowledge graph comprises a depth-bounded breadth-first traversal of the knowledge graph.

4. The apparatus of claim 1, wherein the computer readable instructions, when executed, further causes the apparatus to: generate a score for each instance-level path of the initial set of instance-level paths based on a measure of strength of association between consecutive edges of a respective instance-level path of the initial set of instance-level paths, a frequency of an edge sequence of the respective instance-level path, and a path length of the respective instance-level path.

5. The apparatus of claim 4, wherein each score reflects a preference for stronger associations between the consecutive edges, a higher frequency of the edge sequence, and a shorter path length.

6. The apparatus of claim 5, wherein the computer readable instructions, when executed, further causes the apparatus to:
select one or more instance-level paths of the initial set of instance-level paths based on a respective Z-score of each of the one or more instance-level paths of the initial set of instance-level paths being greater than or equal to a threshold, wherein the respective Z-score accounts for the score of the respective instance-level path.

7. The apparatus of claim 1, wherein the generation of the subsequent set of instance-level paths using the subset of the initial set of instance-level paths is based on a first set of instances of the knowledge graph that are associated with a first type and a second set of instances of the knowledge graph that are associated with a second type,
wherein the plurality of start instances, of the subset of the initial set of instance-level paths, are associated with the first type and the plurality of associated end instances, of the subset of the initial set of instance-level paths, are associated with the second type, and
wherein the first set of instances and the second set of instances have not been previously used to generate instance-level paths.

8. The apparatus of claim 1, wherein the computer readable instructions, when executed, further causes the apparatus to:
determine an activation score for each instance-level path of the subsequent set of instance-level paths based on one or more of a measure of strength of association between consecutive edges of a corresponding instance-level path of the subsequent set of instance-level paths, a frequency of edge sequence of the corresponding instance-level path, a path length of the corresponding instance-level path, a measure of similarity of the corresponding instance-level path with each instance-level path of the initial set of instance-level paths, and a measure of entropy of the corresponding instance-level path with one or more instance-level paths of the subset of the initial set of instance-level paths.

9. The apparatus of claim 8, wherein the Z-score accounts for the activation score of the respective instance-level path of the subsequent set of the instance-level paths.

10. The apparatus of claim 9, wherein the computer readable instructions, when executed, further cause the apparatus to:
generate a second subsequent set of instance-level paths using the subset of the subsequent set of instance-level paths;
select a subset of the second subsequent set of instance-level paths; and
generate a third subsequent set of instance-level paths using the selected subset of the second subsequent set of instance-level paths.

11. The apparatus of claim 1, wherein the computer readable instructions, when executed, further cause the apparatus to:
select the subset of the subsequent set of instance-level paths; and group at least one instance-level path of the subset of the initial set of instance-level paths that comprises an edge sequence and at least one instance-level path of the subset of the subsequent set of instance-level paths that comprises the edge sequence.

12. The apparatus of claim 1,
wherein a type of a first instance of one instance-level path, of the subset of the initial set of instance-level paths, matches a type of a first instance of each other instance-level path of the subset of the initial set of instance-level paths; and
wherein a type of an end instance of the one instance-level path, of the subset of the initial set of instance-level paths, matches a type of an end instance of each of the other instance-level paths of the subset of the initial set of instance-level paths.

13. An apparatus comprising:
a processor; and
a memory for storing computer readable instructions that, when executed by the processor, cause the apparatus to:
prior to receiving an utterance by a user, generate a first set of instance-level paths by applying training examples to a knowledge graph;
generate a second set of instance-level paths using a subset of the first set of instance-level paths, wherein the second set of instance-level paths is different from the subset of the first set of instance-level paths;
select a subset of the second set of instance-level paths based on a Z-score of a respective instance-level path of the second set of instance-level paths being greater than or equal to a threshold modified by an inverse decay;
group a first instance-level path of the subset of the first set of instance-level paths and a second instance-level path of the subset of the second set of instance-level paths into a group, wherein the first instance-level path comprises an edge sequence and the second instance-level path comprises the edge sequence;
produce an inference path for the group;
associate a natural language explanation template with the inference path;
receive the utterance by the user; and
output a natural language explanation, wherein the natural language explanation is based on:
the utterance,
the natural language explanation template, and
the inference path.

14. The apparatus of claim 13, wherein the computer readable instructions, when executed, further causes the apparatus to:
generate a first activation score for the first instance-level path and a second activation score for the second instance-level path; and
generate a group score based on a standard deviation of at least the first activation score and the second activation score.

15. The apparatus of claim 13,
wherein a type of a start instance of the first instance-level path matches a type of a start instance of the second instance-level path, and
wherein a type of an end instance of the first instance-level path matches a type of an end instance of the second instance-level path.

16. The apparatus of claim 13, wherein the computer readable instructions, when executed, further causes the apparatus to:

determine an activation score for an instance-level path of the second set of instance-level paths based on one or more of a measure of strength of association between consecutive edges of the instance-level path, a frequency of edge sequence of the instance-level path, a path length of the instance-level path, a measure of similarity of the instance-level path with the subset of the first set of instance-level paths, and a measure of entropy of the instance-level path with the subset of the first set of instance-level paths; and
select the instance-level path to produce the second instance-level path based on a Z-score filter that uses the activation score as input.

17. An apparatus comprising:
a processor; and
a memory for storing computer readable instructions that, when executed by the processor, cause the apparatus to:
prior to receiving an utterance by a user, generate, based on training data and a knowledge graph, a first set of instance-level paths;
generate, based on a subset of the first set of instance-level paths, a second set of instance-level paths different from the first set of instance-level paths;
select a subset of the second set of instance-level paths based on a Z-score of a respective instance level path of the second set of instance-level paths being greater than or equal to a threshold modified by an inverse decay;
generate, based on the subset of the first set of instance-level paths and the subset of the second set of instance-level paths, an inference path;
associate an inference trigger with the inference path;
monitor the utterance by the user for the inference trigger;
determine that the inference trigger has been found in the utterance;
traverse the knowledge graph comprising a plurality nodes connected by a plurality of relations using the inference path associated with the inference trigger;
in response to a determination that an instance of the knowledge graph has a type that matches a type of an end node of the inference path, recording the instance as a conclusion of applying the inference path to the knowledge graph; and
output a natural language explanation, wherein the natural language explanation is based on the utterance and the conclusion.

18. The apparatus of claim 17, wherein the computer readable instructions, when executed, further causes the apparatus to:
record each instance of the knowledge graph traversed using the inference path.

19. The apparatus of claim 18, wherein the computer readable instructions, when executed, further causes the apparatus to:
determine a natural language template for the inference path;
instantiate the inference path with the recorded instances; and
instantiate the natural language template with the instantiated inference path to generate an explanation.

20. The apparatus of claim 19, wherein the computer readable instructions, when executed, further causes the apparatus to:
    display the explanation to a user without showing highlighted word occurrences.

* * * * *